Dec. 21, 1926.  
H. M. PFLAGER  
1,611,670  
LOCOMOTIVE STRUCTURE  
Filed March 23, 1926  
2 Sheets-Sheet 1

INVENTOR  
HARRY M. PFLAGER  
By Cornwall, Bedell & James  
ATTYS.

Dec. 21, 1926.  
H. M. PFLAGER  
1,611,670  
LOCOMOTIVE STRUCTURE  
Filed March 23, 1926  2 Sheets-Sheet 2

INVENTOR  
HARRY M. PFLAGER  
BY Cornwall, Riddell & James  
ATTYS.

Patented Dec. 21, 1926.

1,611,670

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

LOCOMOTIVE STRUCTURE.

Application filed March 23, 1926. Serial No. 96,732.

My invention relates to railway rolling stock and consists in novel locomotive ash pan and ash pan mounting structure, particularly adapted for use on locomotives having radial trailer trucks.

When a large locomotive is on a curve, the rear end of the fire box may swing as much as ten or twelve inches from the center line of the track and shift relative to the center line of the truck to substantially the same extent. If the ash pan is carried on the trailer truck and is made wide enough to extend entirely beneath the sides of the fire box when the locomotive is on a curve, the ash pan will often extend beyond the established clearance limit.

The general object of my invention is to provide an ash pan structure which will eliminate any projection beyond the clearance line as mentioned above and I attain this object by a two-piece ash pan structure, the upper portion of the ash pan being mounted upon the locomotive superstructure and movable therewith and the lower portion of the ash pan being mounted upon the trailer truck and movable therewith, the two parts of the ash pan being designed to cooperate with each other to accommodate relative transverse movement due to the passage of the locomotive over curves in the track.

An additional object of my invention is to provide suitable air passages from the exterior of the ash pan to the interior of the fire box.

In the accompanying drawings which illustrate my invention—

Figure 2:
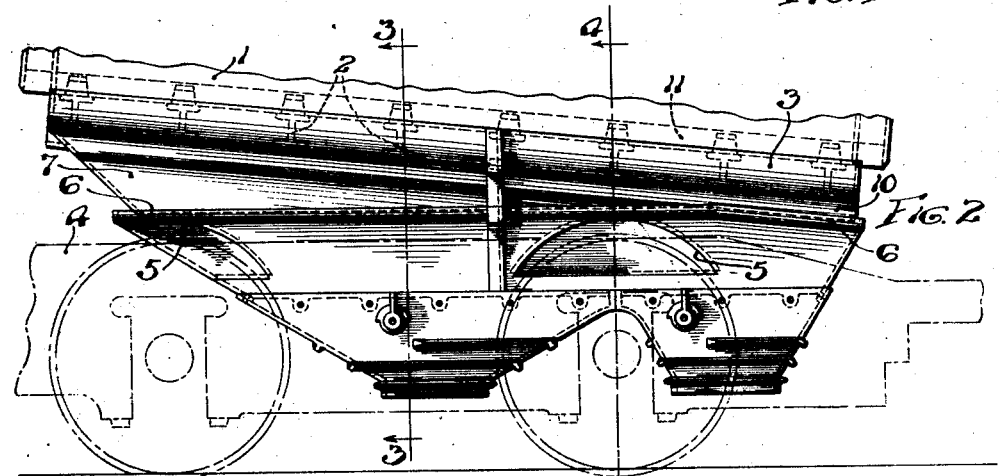
Figure 2 is a side elevation of my invention with the fire box, mud ring and trailer truck also indicated.
Figure 3:
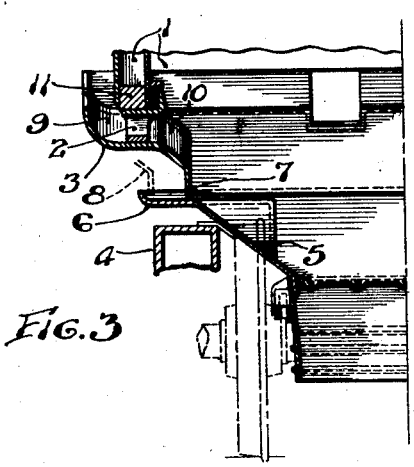
Figure 4:
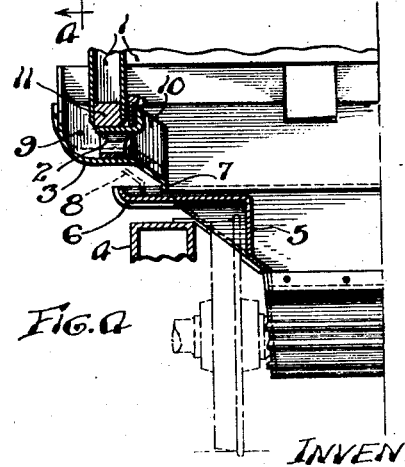

Figures 3 and 4 are transverse vertical sections on lines 3—3, and 4—4, respectively, of Figure 2.

Figure 1:
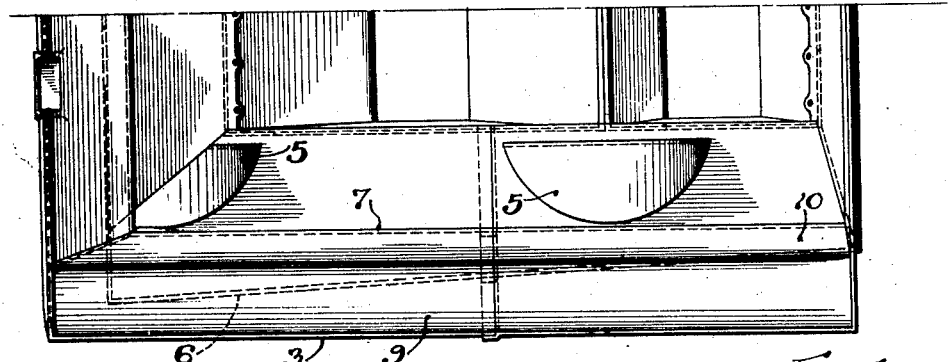
Figure 1 is a half longitudinal top view of my complete ash pan structure.
Figure 5:
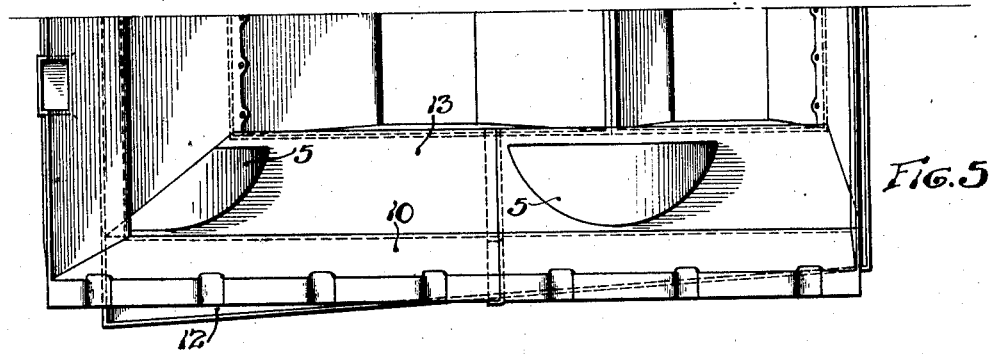

Figure 5 is a top view corresponding to Figure 1 but illustrating a modified embodiment of my invention.

Figure 6:
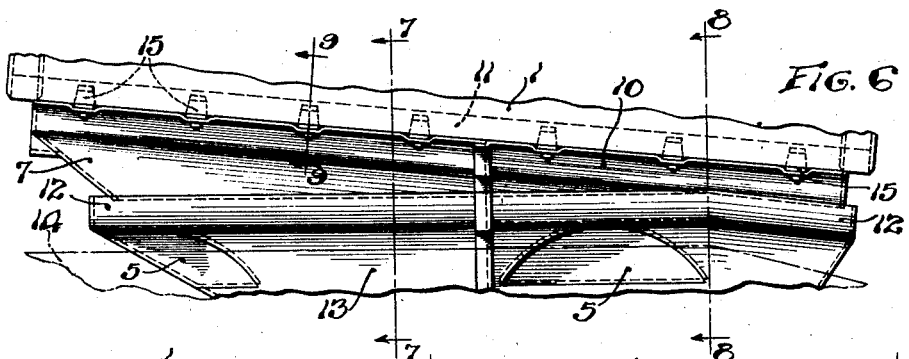

Figure 6 is a fragmentary side elevation of the structure shown in Figure 5.

Figure 7:
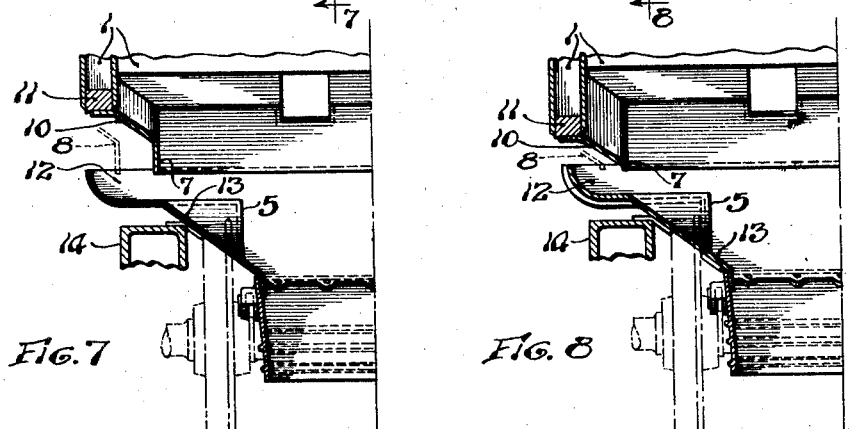
Figure 8:
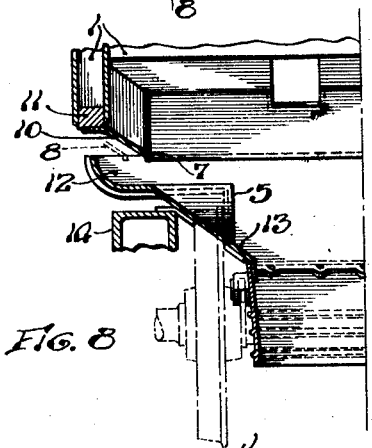
Figures 9, 10, 11:
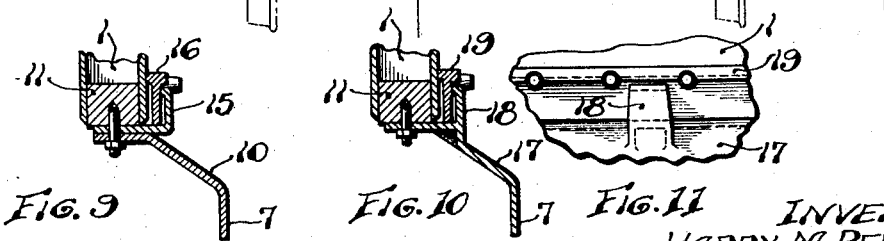

Figures 7, 8, and 9 are vertical transverse sections taken on lines 7—7, 8—8, and 9—9, respectively, of Figure 6.

Figure 10 is a detail section corresponding to Figure 9 but illustrating different arrangement of the parts shown.

Figure 11 is an elevation of the structure shown in Figure 10.

In order to simplify the illustration of my invention, no part of the locomotive superstructure is shown except the lower portion of the fire box terminating in a mud ring 1 which carries a plurality of depending brackets 2. A depending skirt or apron 3 forming the upper portion of the ash pan structure is mounted on brackets 2 and extends outwardly and upwardly therefrom, so as to retain all of the ashes that drop from the fire box, and extends downwardly and inwardly from the brackets 2 for a short distance, terminating, however, at a point well above the top of the trailer truck frame 4.

The lower or hopper portion 5 of the ash pan is mounted upon the truck frame 4 and in addition to the main inclined walls includes an upper outwardly extending horizontal flange 6 normally projecting a substantial distance beyond the lower end 7 of the upper portion of the ash pan secured to the mud ring. When the locomotive is on a curve, the upper portion of the ash pan will move to the right or left of the lower portion and may assume a position such as indicated in broken lines at 8 (Figures 3 and 4). The proportions and arrangement of the ash pan parts are such that there will be no interference between them irrespective of the relative movements of the superstructure and truck.

By mounting the upper portion of the ash pan on brackets 2, I provide a suitable passage 9 for air between the mud ring and ash pan but this arrangement may not always be necessary or practical, and in the modified structure on the second sheet of drawings I show the upper portion 10 of the ash pan depending from the superstructure as being secured directly to the mud ring 11, the air space being provided at 12 between the two portions of the ash pan. The lower portion 13 of the ash pan is mounted on the truck frame 14 similarly to the mounting of the lower portion of the ash pan shown in the preferred structure.

In the detail illustrated in Figure 9, I show the positioning of a bracket 15 between the ash pan portion 10 and the mud ring 11, the bracket 15 serving to support and position the grate bar 16.

In the modification illustrated in Figures 10 and 11, I show the upper portion 17 of the ash pan so shaped as to include an integral bracket 18 for supporting and positioning the grate bar 19.

Various other modifications in the details of my structure may be made, such as the forming of the lower portion of the ash pan integrally with the truck frame as described and claimed in my copending Patents Nos. 1,593,465 and 1,593,466 and I contemplate the exclusive use of any modifications in the details thereof as expressed in my claims.

I claim:

1. In a locomotive, a superstructure including a fire box, a truck, an ash pan mounted on said truck, and depending elements on said superstructure for directing ashes from said fire box to said ash pan.

2. In a locomotive, a superstructure including a fire box, a truck movable relative to said superstructure, an ash pan mounted on said truck, and depending elements on said superstructure for directing ashes from said fire box to said ash pan.

3. In a locomotive, a superstructure including a fire box, a truck movable transversely of said superstructure, an ash pan mounted on said truck, and inwardingly extending depending elements on said superstructure for directing ashes from said fire box to said ash pan.

4. In a locomotive, a superstructure including a fire box, elements depending from said superstructure for directing ashes from said fire box, there being an air passage between the upper edges of said elements and said superstructure to the interior of said fire box, and a separate ash pan member below said elements and movable relative thereto and being narrower than said fire box.

5. In a locomotive, a superstructure including a fire box member, means depending from said superstructure for directing ashes from said fire box, and a separate ash pan hopper member below said depending members and movable relative thereto, there being an air passage between at least two of said members for admitting air to the interior of the fire box member.

6. In a locomotive, a trailer truck frame, a fire box, the inside width of which exceeds the width of said truck frame, an ash pan hopper mounted on said truck frame with its upper portion extending above and outwardly of said truck frame to beneath the sides of said fire box, and a depending skirt on said fire box extending inwardly of the outer edge of said hopper.

7. In a locomotive, a radial trailer truck frame, a fire box, the inside width of which exceeds the width of said truck frame, an ash pan hopper mounted on said truck frame with its upper portion extending above and outwardly of said truck frame to beneath the sides of said fire box, and a depending skirt on said fire box extending inwardly of the outer edge of said hopper, and terminating in a lower edge positioned within the latter far enough to permit relative horizontal movement of said hopper without creating a gap between them for the passage of ashes outside of said hopper.

8. In a locomotive, a mud ring, an ash pan member carried by said mud ring and extending inwardly therefrom for a short distance, a truck, and a separate ash pan lower member carried by said truck and extending below the inner portion of said ash pan upper member.

9. In a locomotive, a mud ring, depending brackets thereon, an ash pan upper member mounted on said brackets so as to provide an air passage beneath said mud ring, said member extending downwardly and inwardly for a short distance, a truck, and a separate ash pan lower member carried by said truck beneath said ash pan upper member, said members being adapted to clear each other to accommodate relative movement of the truck and mud ring.

10. In a locomotive, a fire box mud ring, and a depending member carried by said mud ring and forming a shallow upper section of an ash pan, the lower edges of which section are adapted to move over the body of the ash pan carried on a trailer truck beneath the fire box.

In testimony whereof I hereunto affix my signature this 19 day of March, 1926.

H. M. PFLAGER.